(12) United States Patent
Dry et al.

(10) Patent No.: US 9,551,044 B2
(45) Date of Patent: Jan. 24, 2017

(54) STARTING A SMELTING PROCESS

(71) Applicant: Technological Resources PTY. Limited, Brisbane (AU)

(72) Inventors: Rodney James Dry, City Beach (AU); Hendrikus Koenraad Albertus Meijer, Uitgeest (NL)

(73) Assignee: Technological Resources Pty. Limited, Brisbane (AU)

( * ) Notice: Subject to any disclaimer, the term of this patent is extended or adjusted under 35 U.S.C. 154(b) by 173 days.

(21) Appl. No.: 14/363,227

(22) PCT Filed: Dec. 6, 2012

(86) PCT No.: PCT/AU2012/001486
§ 371 (c)(1),
(2) Date: Jun. 5, 2014

(87) PCT Pub. No.: WO2013/082658
PCT Pub. Date: Jun. 13, 2013

(65) Prior Publication Data
US 2014/0318320 A1 Oct. 30, 2014

(30) Foreign Application Priority Data
Dec. 6, 2011 (AU) ................................ 2011905068

(51) Int. Cl.
*C21B 11/08* (2006.01)
*C21B 13/00* (2006.01)
(Continued)

(52) U.S. Cl.
CPC ............ *C21B 11/08* (2013.01); *C21B 13/0013* (2013.01); *C21C 5/567* (2013.01); *C22B 5/10* (2013.01);
(Continued)

(58) Field of Classification Search
CPC ...... C21B 11/08; C21B 13/0033; C21C 5/567; C22B 5/10; C22B 5/12; F27D 3/16; F27D 3/18
See application file for complete search history.

(56) References Cited

U.S. PATENT DOCUMENTS 6,387,153 B1    5/2002  Burke
6,423,114 B1 *  7/2002  Burke ................. C21B 13/0013
                                                     75/378
(Continued)

FOREIGN PATENT DOCUMENTS

WO          0022176 A1    4/2000
WO     WO2006110949    * 10/2006

OTHER PUBLICATIONS

Australian Patent Office International-Type Search Report mailed Apr. 2, 2012, for AU 2011905068.
(Continued)

*Primary Examiner* — George Wyszomierski
*Assistant Examiner* — Tina M McGuthry Banks
(74) *Attorney, Agent, or Firm* — Banner & Witcoff, Ltd.

(57) ABSTRACT

A method of starting a molten-bath based melting process includes commencing supplying cold oxygen-containing gas and cold carbonaceous material into a main chamber of a smelting vessel within at most 3 hours after completing a hot metal charge into the vessel and igniting the carbonaceous material and heating the main chamber and molten metal in the main chamber.

14 Claims, 2 Drawing Sheets

(51) Int. Cl.
    *C22B 5/10*     (2006.01)
    *C22B 5/12*     (2006.01)
    *C21C 5/56*     (2006.01)
    *F27D 3/16*     (2006.01)
    *F27D 3/18*     (2006.01)

(52) U.S. Cl.
    CPC . *C22B 5/12* (2013.01); *F27D 3/16* (2013.01); *F27D 3/18* (2013.01); *C21C 2200/00* (2013.01); *F27D 2003/168* (2013.01); *Y02P 10/122* (2015.11); *Y02P 10/136* (2015.11); *Y02P 10/265* (2015.11); *Y02P 10/283* (2015.11)

(56) References Cited

U.S. PATENT DOCUMENTS

| | | | |
|---|---|---|---|
| 6,517,605 B1* | 2/2003 | Bates | C21B 13/0013 75/531 |
| 2009/0031858 A1* | 2/2009 | Farr | C21B 11/08 75/485 |
| 2010/0011908 A1* | 1/2010 | Goodman | C21B 13/0013 75/382 |

OTHER PUBLICATIONS

International Search Report and Written Opinion mailed Feb. 20, 2013, for PCT/AU2012/001486.

\* cited by examiner

STARTING A SMELTING PROCESS

CROSS-REFERENCE TO RELATED APPLICATIONS

The present application is a U.S. National Phase filing of International Application No. PCT/AU2012/001486, filed on Dec. 6, 2012, designating the United States of America and claiming priority to Australian patent application No. 2011905068, filed Dec. 6,2011, and this application claims priority to and the benefit of the above-identified applications, which are both incorporated by reference herein their entireties.

TECHNICAL FIELD

The present invention relates to a method of starting a process for smelting a metalliferous material.

The term "metalliferous material" is understood herein to include solid feed material and molten feed material. The term also includes within its scope partially reduced metalliferous material.

BACKGROUND ART

The present invention relates particularly, although by no means exclusively, to a method of starting a molten bath-based smelting process for producing molten metal from a metalliferous feed material in a smelting vessel that has a strong bath/slag fountain generated by gas evolution in the molten bath, with the gas evolution being at least partly the result of devolatilisation of carbonaceous material in the molten bath.

In particular, although by no means exclusively, the present invention relates to a method of starting a process for smelting an iron-containing material, such as an iron ore, and producing iron.

The present invention relates particularly, although by no means exclusively, to a method of starting a smelting process in a smelting vessel that includes a main chamber for smelting metalliferous material.

A known molten bath-based smelting process, generally referred to as the HIsmelt process, is described in a considerable number of patents and patent applications in the name of the applicant.

Another molten bath-based smelting process, referred to hereinafter as the "HIsarna" process, is described in International application PCT/AU99/00884 (WO 00/022176) in the name of the applicant.

The HIsmelt process and the HIsarna process are associated particularly with producing molten iron from iron ore or another iron-containing material.

The HIsarna process is carried out in a smelting apparatus that includes (a) a smelting vessel that includes a main smelting chamber and lances for injecting solid feed materials and oxygen-containing gas into the main chamber and is adapted to contain a bath of molten metal and slag and (b) a smelt cyclone for pre-treating a metalliferous feed material that is positioned above and communicates directly with the smelting vessel.

The term "smelt cyclone" is understood herein to mean a vessel that typically defines a vertical cylindrical chamber and is constructed so that feed materials supplied to the chamber move in a path around a vertical central axis of the chamber and can withstand high operating temperatures sufficient to at least partially melt metalliferous feed materials.

In one form of the HIsarna process, carbonaceous feed material (typically coal) and optionally flux (typically calcined limestone) are injected into a molten bath in the main chamber of the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot reaction gases (typically CO, $CO_2$, $H_2$, and $H_2O$) produced in the molten bath is partially combusted by oxygen-containing gas (typically technical-grade oxygen) in an upper part of the main chamber. Heat generated by the post-combustion is transferred to molten droplets in the upper section that fall back into the molten bath to maintain the temperature of the bath. The hot, partially-combusted reaction gases flow upwardly from the main chamber and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Finely divided incoming metalliferous feed material is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the main chamber. The hot, partially melted metalliferous feed material is thrown outwards onto the walls of the smelt cyclone by cyclonic swirl action and, as described above, flows downwardly into the smelting vessel below for smelting in the main chamber of that vessel.

The net effect of the above-described form of the HIsarna process is a two-step countercurrent process. Metalliferous feed material is heated and partially reduced by outgoing reaction gases form the smelting vessel (with oxygen-containing gas addition) and flows downwardly into the smelting vessel and is smelted to molten iron in the smelting vessel. In a general sense, this countercurrent arrangement increases productivity and energy efficiency.

The above description is not to be taken as an admission of the common general knowledge in Australia or elsewhere.

The applicant has proposed that the HIsarna process and an oxygen-blown version of the HIsmelt process be started up in a smelting vessel by feeding hot metal (from an external source) into the main chamber of the vessel via the forehearth of the vessel, commencing supplying oxygen-containing gas (typically technical grade oxygen) and solid carbonaceous material (typically coal) and generating heat in the main chamber. This hot start-up method generates heat via spontaneous ignition of combustible material in the main chamber. The applicant has proposed that this initial step in the hot start-up method be followed by the addition of slag-forming agents and, later on, by the addition of metalliferous feed material (such as ferruginous material such as iron ore) into the main chamber.

In pilot plant trials of the HIsarna process that were based on cold technical-grade oxygen as the oxygen-containing gas, coal as the solid carbonaceous material, and iron ore fines as the metalliferous material, the applicant found that such a start-up can fail under certain conditions. By inadvertently allowing a long period of time to pass between charging hot metal and admitting oxygen/coal into the main chamber of the smelting vessel, it was found that coal-oxygen ignition could fail despite that fact that fresh hot metal had recently been poured into the main chamber. This led to an un-combusted mixture of coal and oxygen leaving the smelting vessel, and this in turn triggered a coal dust explosion in a downstream waste heat boiler.

The applicant believes that this type of situation must be avoided since it can lead to serious injury and/or equipment damage. As a consequence of this failed start-up, the applicant subsequently installed a camera in the smelting vessel to observe directly what was causing ignition failure.

Video footage showed that, when hot metal is poured into the main chamber of the smelting vessel, there are spontaneous sparks and small splashes of hot metal which are easily capable of igniting a cold oxygen-coal mixture in the main chamber. However, as time passes, a thin layer of slag builds on the hot metal surface, and hot metal splashing activity gradually dies down. Eventually, the metal becomes completely blanketed with a slag crust, and metal splashing activity stops. If oxygen and coal are fed under these conditions, it is believed that ignition can fail.

The slag is believed to come from two sources: (1) slag left behind in the main chamber of the smelting vessel from previous operations, such as previous smelting campaigns, and (2) oxidation of certain metal species (particularly silicon) in hot metal. The degree to which the latter occurs is a function of how much silicon is present in the charge metal and, in cases where silicon is deliberately increased as part of start-up, this effect is intensified. The important practical conclusion is that a slag layer can always form, and a safe start-up method must accommodate this possibility.

Slag layer formation is a function of vessel geometry, charge metal temperature/composition and vessel condition (e.g. thickness of existing freeze layers on side walls of vessels). When hot metal is poured into a main chamber of a smelting vessel, there is an immediate loss of heat by radiation from the relatively quiescent bath surface to the side walls of the main chamber that are above the hot metal. These side walls may be refractory walls. In the case of the smelting vessel of particular interest to the applicant, the side walls include water-cooled panels. Metal, by virtue of having a high density and a relatively low viscosity under these conditions, tends to circulate within itself. This suppresses any initial tendency to form a solidified or highly viscous uniform crust across its top surface. Slag, on the other hand, tends to float as a more or less uniform thin layer on top of the metal. As it loses heat by radiation, its viscosity rises and it becomes sticky. Under these conditions an insulating slag crust (in effect an insulating "blanket") is effectively formed on top of the hot metal. This is considered by the applicant to be the key mechanism associated with the ability of slag to compromise oxygen-coal ignition under start-up conditions. This is a time-related mechanism.

Understanding the time-scale associated with the formation of this slag crust is critical for safe plant operation. For the pilot plant described herein, the (metal) bath diameter was around 2.6 m and the top space was defined by fully water-cooled panels in the side walls and the roof of the smelting vessel. A provisional (sacrificial) cast/gunned refractory layer was present on the water panels at the time. In the trial involving the failed start-up (leading to the coal dust explosion), metal was charged into the main chamber of the vessel and 7 separate attempts were made to start the process by adding oxygen and coal to the main chamber. Of these, 6 were made within the first 2 hours after charging, and each time it was possible to show that ignition had indeed taken place (from water panel heat load and gas composition data) but the start-up attempt had subsequently failed for reasons unrelated to ignition. The 7th (and last) attempt was made around 2.5 hours after completion of the hot metal charge. It is this attempt that led to final ignition failure and the resulting coal dust explosion.

For this particular smelting facility, there appears to be a "safe" ignition time-window of around 1-2 hours after completion of hot metal charging (during which spontaneous ignition of oxygen and coal can be reasonably assured). Beyond this, safe ignition is not assured and an alternate cold start-up method needs to be followed. The cold start-up method is described in a companion International application entitled "Starting a Smelting Process" lodged in the name of the applicant on the same day as the International application for the present invention.

Translation of this specific time-window to other smelting facilities must be undertaken with care, giving due consideration to the factors discussed above (vessel geometry, charge metal conditions etc).

SUMMARY OF THE DISCLOSURE

The method of starting a smelting process of the present invention is applicable to starting any molten bath-based smelting process when a fresh hot metal charge has been added as part of start-up from an empty-vessel condition.

According to the present invention there is provided a method of starting a molten-bath based process for smelting a metalliferous feed material in a smelting apparatus, with the apparatus including a smelting vessel that includes a main chamber for containing a molten bath, a forehearth for discharging molten metal from the main chamber during a smelting campaign, and a forehearth connection that connects the main chamber and the forehearth, and with the method including the steps of:

(a) preheating the main chamber, the forehearth, and the forehearth connection;

(b) pouring a charge of hot metal into the main chamber via the forehearth;

(c) commencing supplying cold oxygen-containing gas and cold carbonaceous material into the main chamber within at most 3 hours after completing the hot metal charge and igniting the carbonaceous material and heating the main chamber and molten metal in the main chamber;

(d) continuing supplying oxygen-containing gas and carbonaceous material into the main chamber and combusting carbonaceous material and heating the main chamber and molten metal in the main chamber for a period of at least 10 minutes; and (e) commencing feeding a metalliferous material into the main chamber in order to initiate metal production.

By way of explanation of the selection of an upper ignition time limit of 3 hours in step (c), as is described above, the upper time limit of 2 hours for safe ignition arising from the pilot plant trials was subject to various factors associated with the size and operating conditions of the pilot plant. Taking into account these factors for the pilot plant and having regard to factors that are relevant to other molten bath-based smelting facilities, the applicant concluded that under conditions other than those used in the pilot plant this time period for safe ignition could expand to as much as 3 hours in other smelting facilities.

The term "cold" in the context of oxygen-containing gas is understood herein to mean cold in the sense that the gas is at a temperature below that required for spontaneous ignition of the carbonaceous material and the oxygen-containing gas mixture (i.e. below about 700-800° C. in the case of a coal-oxygen mixture).

The term "cold" in the context of carbonaceous material is understood herein to mean solid material below 150° C.

The method may include verifying ignition of oxygen-containing gas and carbonaceous material in the main chamber. The verification may be via water panel heat loads and/or an on-line gas analysis system for the smelting apparatus and/or direct observation using a camera or a suitable opening in the vessel (if process conditions allow this).

Step (a) may include preheating a hearth of the vessel, the forehearth, and the forehearth connection for example using a suitable fuel gas, such that an average surface temperature of the hearth, the forehearth, and the forehearth connection is above 1000° C., preferably above 1200° C.

The charge of molten metal in step (b) may include multiple individual ladles of hot metal.

Step (b) may include selecting the amount of the charge of hot metal into the main chamber via the forehearth such that the metal level in the main chamber is at least 100 mm above the top of the forehearth connection.

Step (b) may include selecting the amount of the charge of hot metal into the main chamber via the forehearth such that the metal level in the main chamber is at least 200 mm above the top of the forehearth connection.

Step (c) may include commencing supplying oxygen-containing gas and carbonaceous material into the main chamber within 2 hours after completion of the hot metal charge into the main chamber.

Step (c) may include commencing supplying oxygen-containing gas and carbonaceous material into the main chamber within 1 hour after completion of the hot metal charge into the main chamber.

Step (c) may include commencing supplying coal carbonaceous material into the main chamber before commencing supplying oxygen-containing gas into the main chamber.

Step (c) may include commencing supplying coal carbonaceous material and oxygen-containing gas into the main chamber at the same time.

Step (c) may include commencing supplying oxygen-containing gas into the main chamber before commencing supplying coal carbonaceous material into the main chamber.

Step (c) may include selecting the ratio of solid carbonaceous material and oxygen-containing gas to ensure complete combustion of the solid carbonaceous material.

Step (d) may include increasing the ratio of solid carbonaceous material and oxygen-containing gas.

Step (d) may include heating the main chamber for a period of 30-60 minutes by combusting carbonaceous material and oxygen-containing gas in the main chamber.

The initial feed rates of oxygen-containing gas and carbonaceous material into the main chamber in step (c) above are preferably calculated such that there is sufficient oxygen to fully combust the carbonaceous material. This is generally consistent with maximum heat generation and highest probability of achieving good ignition.

Once this initial ignition step (c) has been completed, the rates of oxygen-containing gas and carbonaceous material are preferably adjusted in step (d) from the step (c) rates such that there is roughly half, preferably at least 40% of the amount of oxygen for complete combustion of the carbonaceous material. This brings the oxygen potential of the main chamber more or less into its normal range for smelting and prevents excessive oxidation of molten materials.

The method may include, following step (d) and before step (e), feeding slag or slag-forming agents into the main chamber in order to establish a suitable slag inventory for smelting metalliferous material in the main chamber.

The smelting vessel may include a refractory-lined hearth.

The forehearth may be a refractory-lined forehearth.

The smelting vessel may include partially water-cooled side walls that define a top space of the main chamber of the vessel.

The smelting vessel may include lances/tuyeres for injecting carbonaceous material into the bath in the main chamber of the vessel.

The smelting vessel may include lances/tuyeres for injecting oxygen-containing gas into the top space of the main chamber of the vessel.

The apparatus may include (i) the above-described smelting vessel that is adapted to contain a bath of molten metal and (ii) a smelt cyclone that is positioned above and communicates with the smelting vessel. In that event, step (e) may include commencing supplying metalliferous feed material and additional oxygen-containing gas into the smelt cyclone and generating a rotating flow of material in the cyclone and combusting combustible gas flowing upwardly into the cyclone from the vessel and partially reducing and melting the metalliferous feed material in the cyclone, whereby the partially reduced molten metalliferous feed material flows downwardly from the cyclone into the molten bath of metal and slag in the main chamber of the smelting vessel and is smelted to molten metal in the bath.

The method of present invention is applicable to a molten bath-based smelting apparatus that includes (a) a smelting vessel that has a main chamber that is adapted to contain the bath of molten metal and slag, (b) lances or other suitable means for supplying the carbonaceous material into the bath, (c) lances or other suitable means for supplying the oxygen-containing gas into the bath (d) lances or other suitable means for supplying the metalliferous material into the bath, either directly or indirectly via a smelt cyclone, and (e) at least 40%, typically at least 50%, of the wall region of the smelting vessel above the bath being covered by water-cooled panels with frozen slag layers.

Under normal operating conditions, the molten bath-based smelting process includes the steps of:
(a) supplying carbonaceous material and metalliferous material (which may be solid or molten) into the molten bath and generating reaction gas and smelting metalliferous material and producing molten metal in the bath,
(b) supplying oxygen-containing gas into the main chamber for above-bath combustion of combustible gas released from the bath and generating heat for in-bath smelting reactions, with the oxygen-containing gas typically being technical-grade oxygen which is "cold" in the sense that it is at a temperature significantly below that required for safe ignition of a coal-oxygen mixture (i.e. below about 700-800° C.); and
(c) producing significant upward movement of molten material from the bath by gas upwelling in order to create heat-carrying droplets and splashes of molten material which are heated when projected into the combustion region in the top space of the main chamber and thereafter fall back into the bath,
whereby the droplets and splashes carry heat downwards into the bath where it is used for smelting of the metalliferous material.

The oxygen-containing gas may be air, oxygen, or oxygen-enriched air.

According to the present invention there is provided a method of starting a molten-bath based process for smelting a metalliferous feed material in a smelting apparatus, with the apparatus including a smelting vessel that includes a main chamber for containing a molten bath, a forehearth for discharging molten metal from the main chamber during a smelting campaign, and a forehearth connection that connects the main chamber and the forehearth, and with the method including the steps of:

(a) preheating the main chamber, the forehearth, and the forehearth connection;
(b) pouring a charge of hot metal into the main chamber via the forehearth;
(c) commencing supplying cold oxygen-containing gas and cold carbonaceous material into the main chamber and igniting carbonaceous material and heating the main chamber and molten metal in the main chamber within a time period before an insulating layer of crusty slag forms on the metal charge to an extent that it prevents molten metal igniting carbonaceous material;
(d) continuing supplying oxygen-containing gas and carbonaceous material into the main chamber and combusting carbonaceous material and oxygen-containing gas and heating the main chamber and molten metal in the main chamber for a period of at least 10 minutes; and
(e) commencing feeding a metalliferous material into the main chamber in order to initiate metal production.

BRIEF DESCRIPTION OF THE DRAWINGS

An embodiment of a method of starting a smelting process in a smelting vessel in accordance with the present invention is described with reference to the accompanying drawings, of which.

DESCRIPTION OF EMBODIMENT(S)

The HIsarna process smelts metalliferous feed material and produces process outputs of molten metal, molten slag, and an off-gas. The following description of the HIsarna process is in the context of smelting metalliferous material in the form of iron ore. The present invention is not limited to this type of metalliferous material.

Figure 1:
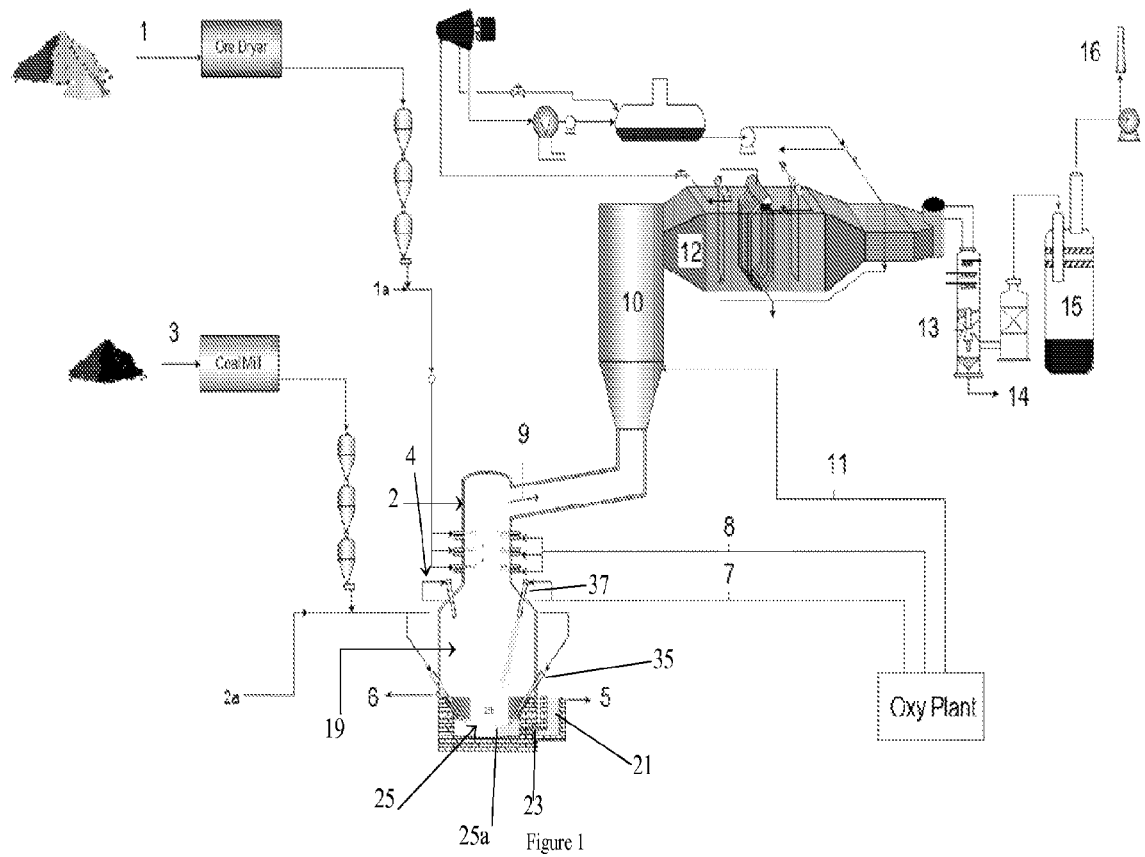
FIG. 1 is a diagrammatic view of a HIsarna apparatus for smelting a metalliferous material and producing molten metal in accordance with one embodiment of the HIsarna process.

The HIsarna apparatus shown in FIG. 1 includes a smelt cyclone 2 and a molten bath-based smelting vessel 4 having a main chamber 19 located directly beneath the smelt cyclone 2, with direct communication between the chambers of the smelt cyclone 2 and the smelting vessel 4.

Figure 2:
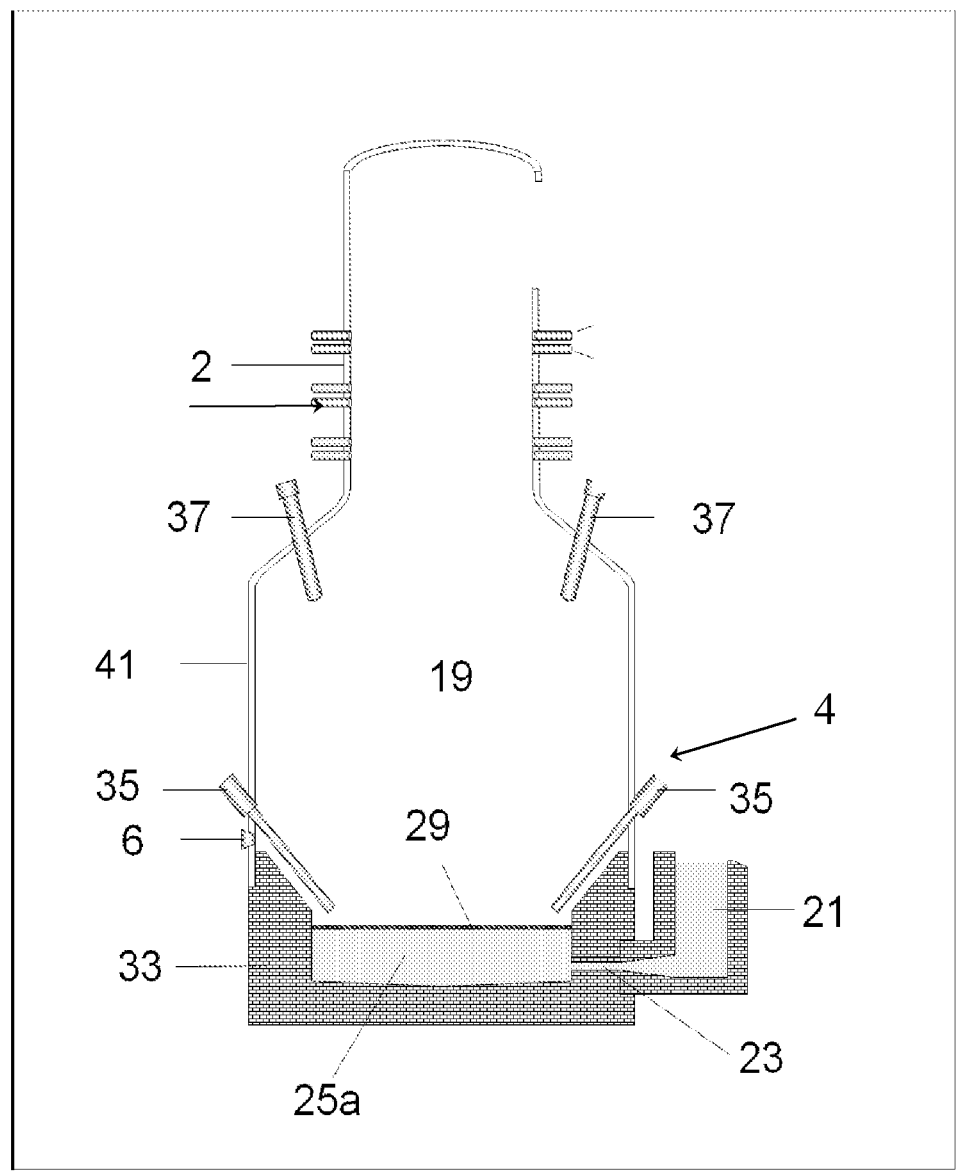
FIG. 2 is an enlarged cross-sectional view of the smelting vessel shown in FIG. 1 which illustrates the condition of the smelting vessel shortly after supplying a charge of molten metal into a main chamber of a smelting vessel of the apparatus shown in FIG. 1 and there is crusty layer forming on the molten metal and molten slag layers in the vessel.

With reference to FIG. 1, during steady-state operation of a smelting campaign, a blend of magnetite-based ore (or other iron ore) with a top size of 6 mm and flux such as limestone 1 is fed, via an ore dryer, and with a pneumatic conveying gas 1a, into the smelt cyclone 2. Limestone represents roughly 8-10 wt % of the combined stream of ore and limestone. Oxygen 8 is injected into the smelt cyclone 2 via tuyeres to preheat and partly melt and partly reduce the ore. The oxygen 8 also combusts combustible gas flowing upwardly into the smelt cyclone 2 from the smelting vessel 4. The partly melted and partly reduced ore flows downwardly from the smelt cyclone 2 into a molten bath 25 of metal and slag in the main chamber 19 in the smelting vessel 4. The partly melted and partly reduced ore is smelted to form molten iron in the molten bath 25. Coal 3 is fed, via a separate dryer, to the main chamber 19 of the smelting vessel 4. The coal 3 and a conveying gas 2a are injected via lances 35 into the molten bath 25 of metal and slag in the main chamber 19. The coal provides a source of a reductant and a source of energy. FIGS. 1 and 2 show the molten bath 25 as comprising two layers, of which layer 25a is a molten metal layer and layer 25b is a molten slag layer. The Figures illustrate the layers as being of uniform depth. This is for illustration purposes only and is not an accurate representation of what would be a highly agitated and well-mixed bath in operation of the HIsarna process. The mixing of the molten bath 25 is due to devolatilisation of coal in the bath, which generates gas, such as CO and $H_2$, and results in upward movement of gas and entrained material from the molten bath into a top space of the main chamber 19 that is above the molten bath 25. Oxygen 7 is injected into the main chamber 19 via lances 37 to post-combust some of these gases, typically CO and $H_2$, generated in and released from the molten bath 25 in the top space of the main chamber 19 and provide the necessary heat for the smelting process in the bath.

Normal operation of the HIsarna process during a smelting campaign involves (a) coal injection via lances 35 and cold oxygen injection via lances 37 into the main chamber 19 of the smelting vessel 4 and (b) ore injection 7 and additional oxygen injection 8 into the smelt cyclone 2.

The operating conditions, including but not limited to, coal and oxygen feed rates into the main chamber 19 of the smelting vessel 4 and ore and oxygen feed rates into the smelt cyclone 2 and heat losses from the main chamber 19, are selected so that offgas leaving the smelt cyclone 2 via an offgas outlet duct 9 has a post-combustion degree of at least 90%.

Offgas from the smelt cyclone 2 passes via an offgas duct 9 to an offgas incinerator 10, where additional oxygen 11 is injected to burn residual CO/$H_2$ and provide a degree of free oxygen (typically 1-2%) in the fully combusted flue gas.

Fully combusted offgas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 15.

Clean flue gas is then vented via a stack 16. This gas consists mainly of $CO_2$ and, if appropriate, it can be compressed and geo-sequestered (with appropriate removal of residual non-condensable gas species).

With particular reference to FIG. 2, the smelting vessel 4 includes a refractory-lined hearth 33 and side walls 41 defined predominantly by water-cooled panels that define the main chamber 19. The smelting vessel 4 also includes a forehearth 21 which is connected to the main chamber 19 via a forehearth connection 23. During the course of a smelting campaign of the HIsarna process, molten metal produced in the main chamber 19 discharges from the main chamber 19 via the forehearth connection 23 and the forehearth 21.

One embodiment of the method for starting the HIsarna process for ironmaking in accordance with the present invention is described below.

At the commencement of the start-up method, the main chamber 19, the forehearth 21, and the forehearth connection 23 of the vessel 4 are empty.

The start-up method includes preheating the hearth 33, the forehearth 21, and the forehearth connection 23, for example using a suitable fuel gas, such that an average surface temperature of the hearth 33, the forehearth 21, and the forehearth connection 23 is above 1000° C., preferably above 1200° C.

After the preheating step is completed, the start-up method includes pouring a selected amount of molten iron into the main chamber 19 via the forehearth 21 and the forehearth connection 23 to establish a molten iron bath 25a in the hearth 33 of the vessel 4. Typically, the amount of the charge is selected such that the molten iron level in the main chamber 19 is at least 100 mm above the top of the forehearth connection 23.

As soon as the molten iron is charged into the main chamber 19, a crusty frozen slag layer 29 begins to form on the surface of the molten iron bath 25a. FIG. 2 illustrates the smelting vessel 4 at this stage in the start-up method. Heat is lost from a top surface of the molten iron bath 25a shown in FIG. 2 by (mainly) radiation to water-cooled panels of the side walls 41 that define the upper section of the main chamber 19.

After completing the step of charging molten iron into the main chamber 19, the start-up method includes supplying coal and oxygen into the main chamber 19 via the lances 35 and 37, respectively.

In a successful start-up method, coal ignites and heat is generated in the main chamber 19.

The key to a safe start-up of the HIsarna process is admission of oxygen 37 and coal injection 35 within a nominal "safe" time-period of less than 3 hours (1-2 hours in this example).

In more general terms, the time window is the period of time before the crusty frozen slag layer 29 forms to an extent that sparks and splashes of molten iron from the molten iron bath 25a into the top space in the main chamber 19 above the molten bath 25a cannot ignite oxygen 37 and coal 35 and there is no other ignition source.

When oxygen 37 and coal 35 are first admitted, the ratio between the two is calculated such that there is sufficient oxygen to burn all the coal 35. After ignition, this condition is only maintained for long enough (5-10 minutes) to verify that ignition is healthy. Thereafter, the coal-to-ore ratio is subsequently adjusted to approximately twice the amount of coal 35 (for full combustion) relative to oxygen 37. The purpose of the increase in the coal-to-ore ratio is to ramp up the levels of carbon for use as a source of a reductant and energy.

Verifying healthy ignition may be via water panel heat loads and/or an on-line gas analysis system for the smelting apparatus and/or direct observation using a camera or a suitable opening in the smelting vessel 4 (if process conditions allow this).

The start-up method may include injecting fluxing agents such as lime or limestone at any time when coal injection is active. The preferred practice is to wait until after the initial 5-10 minute ignition verification stage as described above.

Injection of coal and oxygen (plus flux) is maintained for approximately 30 minutes in order to heat the main chamber 19 and the molten metal in the chamber. At this point crushed slag is pneumatically conveyed into the main chamber 19 via slag notch 6 in order to rapidly establish a suitable slag inventory for normal operation.

Once crushed slag injection is complete, iron ore and oxygen 8 are injected into smelt cyclone 2, coal 35 and oxygen 37 are injected into smelting vessel 4, metal production in the smelting campaign begins, and molten metal is discharged from the main chamber 19 via the forehearth 21 and the forehearth connection 23.

Many modifications may be made to the embodiment of the process of the present invention described above without the departing from the spirit and scope of the invention.

The above description focuses on coal as the carbonaceous material and technical grade oxygen as the oxygen-containing gas. The present invention is not so limited and extends to any suitable oxygen-containing gas and any suitable solid carbonaceous materials.

The above-described embodiment focuses on the HIsarna process. The present invention is not limited to the HIsarna process and extends to any molten bath-based process in a smelting vessel. By way of example, the present invention extends to the oxygen-blown version of the HIsmelt process. As is indicated above, the HIsmelt process is described in a considerable number of patents and patent applications in the name of the applicant. By way of example, the HIsmelt process is described in International application PCT/AU9600197 in the name of the applicant. The disclosure in the patent specification lodged with the International application is incorporated herein by cross-reference.

The invention claimed is:

1. A method of starting a molten-bath based process for smelting a metalliferous feed material in a smelting apparatus, with the apparatus including a smelting vessel that includes a main chamber for containing a molten bath, a forehearth for discharging molten metal from the main chamber during a smelting campaign, and a forehearth connection that connects the main chamber and the forehearth, and with the method including the steps of:
   (a) preheating the main chamber, the forehearth, and the forehearth connection;
   (b) pouring a charge of hot metal into the main chamber via the forehearth;
   (c) commencing supplying cold oxygen-containing gas and cold carbonaceous material into the main chamber within at most 3 hours after completing the hot metal charge before an insulating layer of crusty slag forms on the metal charge to an extent that it prevents molten metal igniting carbonaceous material and igniting the carbonaceous material and heating the main chamber and molten metal in the main chamber;
   (d) continuing supplying oxygen-containing gas and carbonaceous material into the main chamber and combusting carbonaceous material and heating the main chamber and molten metal in the main chamber for a period of at least 10 minutes; and
   (e) commencing feeding a metalliferous material into the main chamber in order to initiate metal production.

2. The method defined in claim 1 includes verifying ignition of oxygen-containing gas and carbonaceous material in the main chamber.

3. The method defined in claim 1 wherein step (a) includes preheating a hearth of the vessel, the forehearth, and the forehearth connection such that an average surface temperature of the hearth, the forehearth, and the forehearth connection is above 1000° C.

4. The method defined in claim 3 wherein step (a) includes preheating the hearth of the vessel, the forehearth, and the forehearth connection such that an average surface temperature of the hearth, the forehearth, and the forehearth connection is above 1200° C.

5. The method defined in claim 1 wherein step (b) includes selecting the amount of the charge of hot metal into the main chamber via the forehearth such that the metal level in the main chamber is at least 100 mm above the top of the forehearth connection.

6. The method defined in claim 5 wherein step (b) includes selecting the amount of the charge of hot metal into the main chamber via the forehearth such that the metal level in the main chamber is at least 200 mm above the top of the forehearth connection.

7. The method defined in claim 1 wherein step (c) includes commencing supplying oxygen-containing gas and carbonaceous material into the main chamber within 2 hours after completion of the hot metal charge into the main chamber.

8. The method defined in claim 7 wherein step (c) includes commencing supplying oxygen-containing gas and carbonaceous material into the main chamber within 1 hour after completion of the hot metal charge into the main chamber.

9. The method defined in claim 1 wherein step (d) includes heating the main chamber for a period of 30-60 minutes by combusting carbonaceous material and oxygen-containing gas in the main chamber.

10. The method defined in claim 1 wherein the initial feed rates of oxygen-containing gas and carbonaceous material into the main chamber in step (c) are calculated such that there is sufficient oxygen to fully combust the carbonaceous material.

11. The method defined in claim 10 wherein, once this initial ignition step (c) is complete, the rates of oxygen-containing gas and carbonaceous material are adjusted in step (d) from step (c) rates such that there is at least 40% the amount of oxygen for complete combustion of the carbonaceous material.

12. The method defined in claim 1 includes, following step (d) and before step (e), feeding slag or slag-forming agents into the main chamber in order to establish a suitable slag inventory for smelting metalliferous material in the main chamber.

13. The method defined in claim 1 wherein the molten bath-based smelting process includes the steps of:
 (a) supplying carbonaceous material and solid or molten metalliferous material into the molten bath and generating reaction gas and smelting metalliferous material and producing molten metal in the bath,
 (b) supplying oxygen-containing gas into the main chamber for above-bath combustion of combustible gas released from the bath and generating heat for in-bath smelting reactions; and
 (c) producing significant upward movement of molten material from the bath by gas upwelling in order to create heat-carrying droplets and splashes of molten material which are heated when projected into the combustion region in the top space of the main chamber and thereafter fall back into the bath, whereby the droplets and splashes carry heat downwards into the bath where it is used for smelting of the metalliferous material.

14. A method of starting a molten-bath based process for smelting a metalliferous feed material in a smelting apparatus, with the apparatus including a smelting vessel that includes a main chamber for containing a molten bath, a forehearth for discharging molten metal from the main chamber during a smelting campaign, and a forehearth connection that connects the main chamber and the forehearth, and with the method including the steps of:
 (a) preheating the main chamber, the forehearth, and the forehearth connection;
 (b) pouring a charge of hot metal into the main chamber via the forehearth;
 (c) commencing supplying cold oxygen-containing gas and cold carbonaceous material into the main chamber and igniting carbonaceous material and heating the main chamber and molten metal in the main chamber within a time period before an insulating layer of crusty slag forms on the metal charge to an extent that it prevents molten metal igniting carbonaceous material;
 (d) continuing supplying oxygen-containing gas and carbonaceous material into the main chamber and combusting carbonaceous material and oxygen-containing gas and heating the main chamber and molten metal in the main chamber for a period of at least 10 minutes; and
commencing feeding a metalliferous material into the main chamber in order to initiate metal production.

\* \* \* \* \*